United States Patent
Mojaver

(10) Patent No.: US 9,485,395 B2
(45) Date of Patent: Nov. 1, 2016

(54) COMPOUND DOME CAMERA ASSEMBLY

(75) Inventor: Michael Mojaver, Poway, CA (US)

(73) Assignee: Epilog Imaging Systems, San Diego, CA (US)

(*) Notice: Subject to any disclaimer, the term of this patent is extended or adjusted under 35 U.S.C. 154(b) by 290 days.

(21) Appl. No.: 13/276,686

(22) Filed: Oct. 19, 2011

(65) Prior Publication Data

US 2013/0100292 A1 Apr. 25, 2013

(51) Int. Cl.
*H04N 5/225* (2006.01)
*H04N 7/18* (2006.01)

(52) U.S. Cl.
CPC ............. *H04N 5/2251* (2013.01); *H04N 7/18* (2013.01)

(58) Field of Classification Search
USPC ................................................. 348/140–151
See application file for complete search history.

(56) References Cited

U.S. PATENT DOCUMENTS

| 6,061,087 | A  | * | 5/2000 | Schieltz et al. ............... 348/151 |
| 6,215,519 | B1 |   | 4/2001 | Nayar et al. |
| 7,963,707 | B2 | * | 6/2011 | Jung et al. .................... 396/427 |
| 2001/0022627 | A1 | * | 9/2001 | Bernhardt ..................... 348/373 |
| 2013/0050495 | A1 | * | 2/2013 | Chen ............................ 348/151 |

FOREIGN PATENT DOCUMENTS

| CN | 101511005 A | * | 8/2009 |
| EP | 1579399 A2 | | 9/2005 |

* cited by examiner

*Primary Examiner* — Geepy Pe
(74) *Attorney, Agent, or Firm* — Reza Mollaaghababa; Thomas Engellenner; Pepper Hamilton LLP

(57) ABSTRACT

In one aspect, the invention provides an imaging system adapted to simultaneously receive light from wide and narrow fields of view, with the wide filed image data collected by an array of fixed position cameras, and the narrow field data collected by a panable, tiltable zoom camera at higher resolution than the fixed array in a selected orientation, and a compound viewing cover that includes two separated pieces interlocked with one another.

15 Claims, 5 Drawing Sheets

COMPOUND DOME CAMERA ASSEMBLY

TECHNICAL FIELD

The present invention is generally directed to video surveillance and more particularly, to systems containing multiple fixed cameras in conjunction with a panable, tiltable zoom camera with a compound viewing cover.

BACKGROUND

Imaging systems are employed in a variety of applications. For example, in surveillance applications, imaging systems can provide still or video images of a field of view, and in some cases, such systems can detect changes in the field of view, e.g., movement of a vehicle, a person, or fire and smoke.

When covering a relatively large area, for example in the order of an acre in size, it may be advantageous to obtain wide field imagery concurrent with detailed zooms of specific areas of interest, for example based on motion to identify people and vehicles.

To achieve above, some surveillance systems use multiple cameras in a single enclosure with a two-part design, the first part consisting of an array of fixed cameras, referred to as sockets in some cases, for viewing the wide field, and a second part consisting of panable tiltable zoom (PTZ) camera to acquire detailed close-up imagery as directed by the first part, either automatically or as specified by an operator.

The primary purpose of most surveillance systems in use today is identification of people and vehicles. The two-part system described above can effectively provide video coverage of a large area, for example a parking lot or the interior of a warehouse or a campus environment, with sufficient image quality and detail for identification purposes.

U.S. Pat. No. 6,215,519 discloses such a surveillance system having a first and second image collection devices, with the second being guided by the first device and mounted within a common framework. At least one known commercial video surveillance system, which is disclosed in European Patent Specification EP 1,579,399 B1, includes a compound camera assembly including eight video cameras mounted in a single housing and including a PTZ camera to cover a hemispherical or semi-hemispherical field of view.

Camera designs disclosed in the above references utilize a combination of sockets (for the reference cameras) covering the wide field and a single PTZ type camera to provide zoom guided by software control. The camera assembly is typically held within a common enclosure to provide a fixed geometric calibration framework and also protect the system from the environment.

The construction of camera designs with multiple sockets is complex and costly and presents multiple failure modes when such systems are installed outdoors and exposed to the elements. Thus, there is a need for improved cameras and associated surveillance systems.

SUMMARY OF THE INVENTION

In view of the above, in one aspect, the invention provides a simplified, robust compound camera with improved optical performance when compared to existing designs. In particular, according to the first aspect, the present invention provides a camera assembly having a two-part design with a first part comprising an array of fixed position cameras working in conjunction with a PTZ camera, where the entire assembly is enclosed by an integrated compound viewing cover.

In one aspect, a camera assembly is disclosed that includes a panable, tiltable zoom (PTZ) camera, and a plurality of fixed cameras, at least one of which has an adjustable tilt, where the fixed cameras are positioned around the PTZ camera. The camera assembly further includes a common compound viewing cover (herein also referred to as a viewing dome) through different portions of which the PTZ camera and the fixed cameras are capable of receiving visible radiation from a field of view. As discussed below, in many embodiments, the common viewing dome is formed of two separated pieces that are coupled to one another using a variety of techniques.

In some embodiments, the fixed cameras are employed to provide a wide field of view reference through a collection of individually adjustable cameras to yield the dynamic coverage of a viewing area for objects or locations of most interest to a user.

The PTZ camera can be, in turn, tiltable on a horizontal axis and rotatable about a vertical axis and can also include a variable zoom. The PTZ camera can be oriented into specific regions of interest as guided by the fixed cameras, either manually by an operator or automatically via software control, for example based on detecting motion, in a manner known in the art.

In some embodiments, the compound viewing cover of the camera assembly is arranged to enclose various components of the camera assembly (e.g., the fixed and PTZ cameras). In some embodiments, the compound cover can comprise a first section and a second section that are interlocked with one another, where the first section comprises a hemispherical dome and the second section comprises a portion of a larger-diameter hemispherical dome. In other words, the second section is in the form of a larger-diameter hemisphere with a cut-out.

In some embodiments, the second section (also referred to herein in some embodiments as the upper section) of the compound cover is aligned with the optical axis of the fixed cameras yielding a low distortion view port. In other words, an extension of the optical axis of each of the fixed cameras intersects the center of a truncated hemisphere, a portion of which comprises the second section.

In some embodiments, the first section (also referred to herein in some embodiments as the lower section) of the compound cover is aligned with the optical axis of PTZ camera providing a distortion free hemispherical view port. In other words, the optical axis of the PTZ camera passes through the center of the hemisphere forming the first section of the cover.

In some embodiments, the upper section has a larger diameter than the lower section, which is coupled to the upper section.

The lower and the upper sections can be coupled using a variety of techniques. For example, they can be thermally fused or adhesively bonded to one another. Alternatively, they can be mechanically coupled to one another using a gasket and a set of screws or any combination, with examples not intended to be limiting.

In general, the different sections of the compound viewing dome can be formed of the same material or different materials having different optical and/or absorption characteristics, particularly in the visible range of the electromagnetic spectrum. For example, in some embodiments, the entire compound dome is formed of a material that is transparent to visible radiation. In other embodiments, one section of the compound dome (e.g., the upper section) can be partially opaque to visible radiation and the other section (e.g., the lower section) can be transparent to visible radiation.

The compound viewing cover of the camera assembly provides a number of advantages. For example, as noted above, the two sections of the viewing cover can be constructed of different materials having unique optical reflection or absorption characteristics. For example, the first or second sections (or both) can be fully transparent or partially opaque to some degree. This may enhance image contrast in certain lighting conditions or selectively disguise the count or orientation of cameras inside the assembly.

Further, in some embodiments, a heating mechanism (e.g., a heating coil) can be advantageously installed at the junction of the upper and lower sections. The heating mechanism functions to defrost and/or prevent condensation on the transparent view port in low temperature conditions.

DETAILED DESCRIPTION

The present invention will now be described with additional detail and in reference to the included drawings which exhibit one exemplary embodiment. The drawings, however, are not intended as limiting and many other variations, forms, shapes and embodiments are conceivable under this invention; rather this embodiment is provided as an example to convey the salient features of this invention to those skilled in the art.

Figure 1:
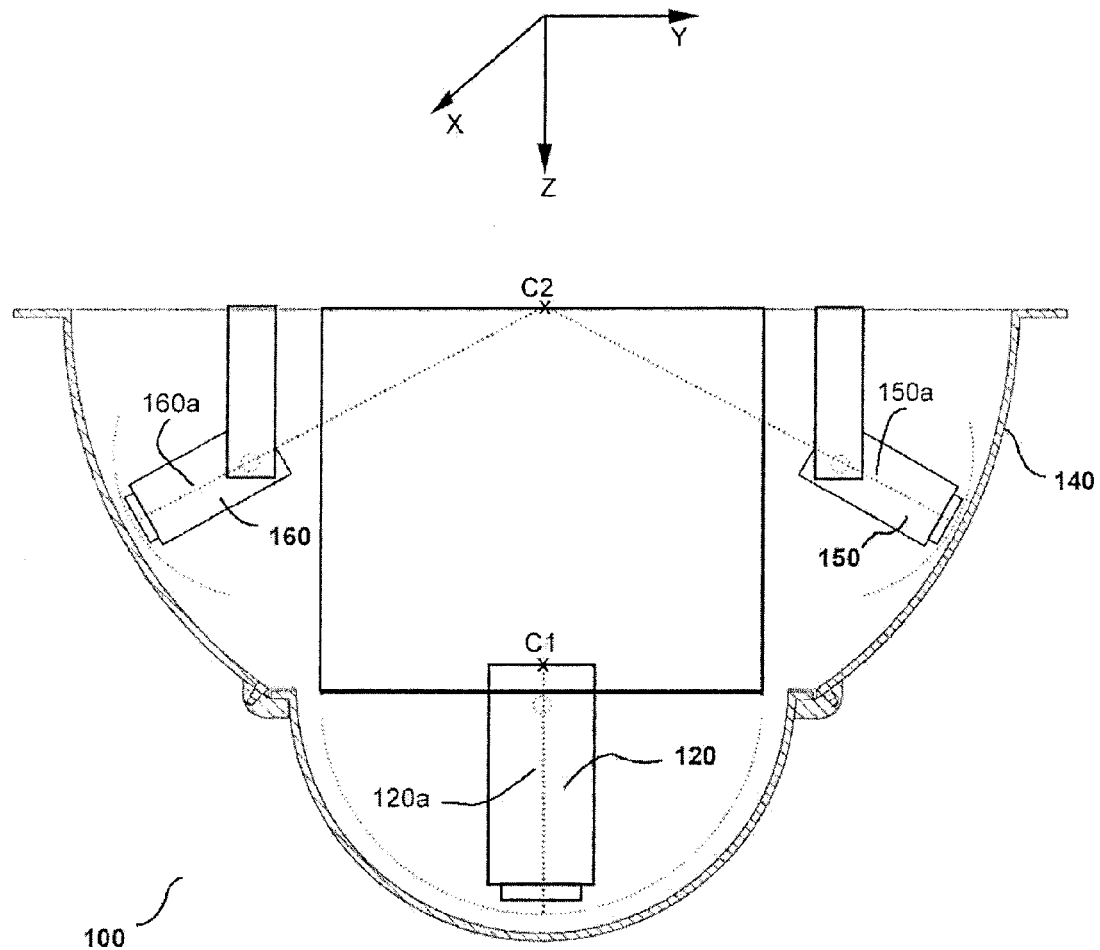
FIG. 1 is a schematic side view of an embodiment of a camera assembly according to the teachings of this invention.

FIG. 1 is a schematic side view of an embodiment of a camera assembly 100, according to the teachings of the invention, which comprises an array of fixed cameras, for example cameras 150 and 160, that are positioned around (e.g., on the perimeter) of a PTZ camera 120, where the entire assembly of the fixed cameras as well as the PTZ camera is enclosed by a compound dome cover 140. In other words, the camera assembly 100 is a multi-part system having at least the following three parts: (a) one or more fixed cameras, (b) a PTZ camera, and (c) a compound viewing cover that allows the fixed cameras and the PTZ camera to concurrently receive image data from an external environment. The fixed cameras 150 and 160 can be tilted to be oriented in a desired orientation and held fixedly in that orientation during use.

Figure 3:
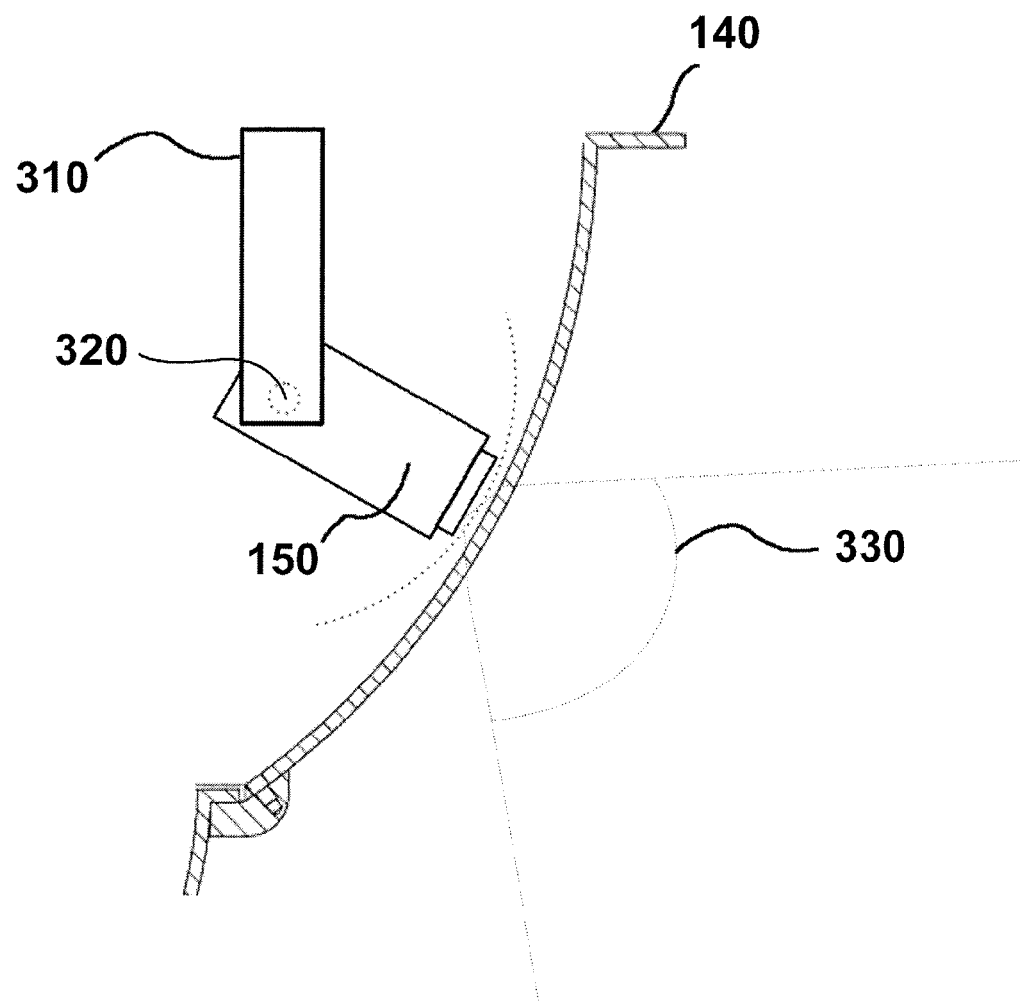
FIG. 3 is another detailed sectional view of another portion of the cross sectional view provided in FIG. 1.

FIG. 3 illustrates that in this embodiment, one of the fixed position cameras 150 is secured by a mount 310 within the enclosure 100 and has adjustable tilt about a horizontal axis 320 (in this description, a vertical axis is assumed to run along the length of the PTZ camera (e.g., z-axis shown in FIG. 1) and two horizontal axes are perpendicular to the vertical axis and to one another (e.g., x and y axes shown in FIG. 1)). The camera 150 has a field of view 330 determined by the focal length of the camera. The other fixed position camera 160 can be similarly mounted on its respective mount and can have adjustable tilt about the horizontal axis 320. The multiple reference cameras can collectively yield the dynamic coverage of a viewing area for objects or locations of most interest to the operator through individual adjustments of each reference camera to best cover a portion of the overall field of view. Such adjustments can be performed manually, for example during installation, or remotely through electromechanical actuators.

Figure 2:
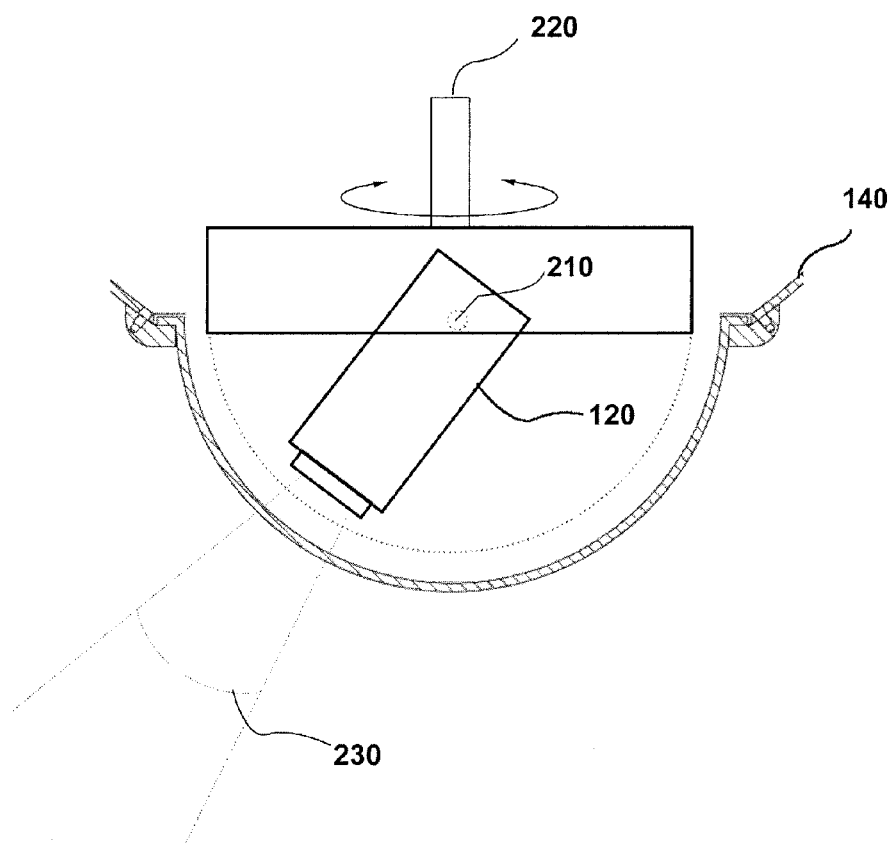
FIG. 2 is a detailed sectional view of a portion of the cross sectional view of the camera assembly provided in FIG. 1.

FIG. 2 illustrates that the PTZ camera 120 is tiltable about a horizontal axis 210 and rotatable about a vertical axis 220 and includes a variable zoom for adjusting the field of view 230. The camera system 100 can be designed to include multiple PTZ cameras in a single enclosure in some embodiments.

The PTZ camera 120 is oriented into sub-regions of interest guided by imagery provided by the fixed position cameras, for example, camera 150 or 160. The reference cameras can serve to automatically guide the PTZ camera, for example based on movement of a person or vehicle, to select portions of the wide field of view for inspection.

Figure 4A:
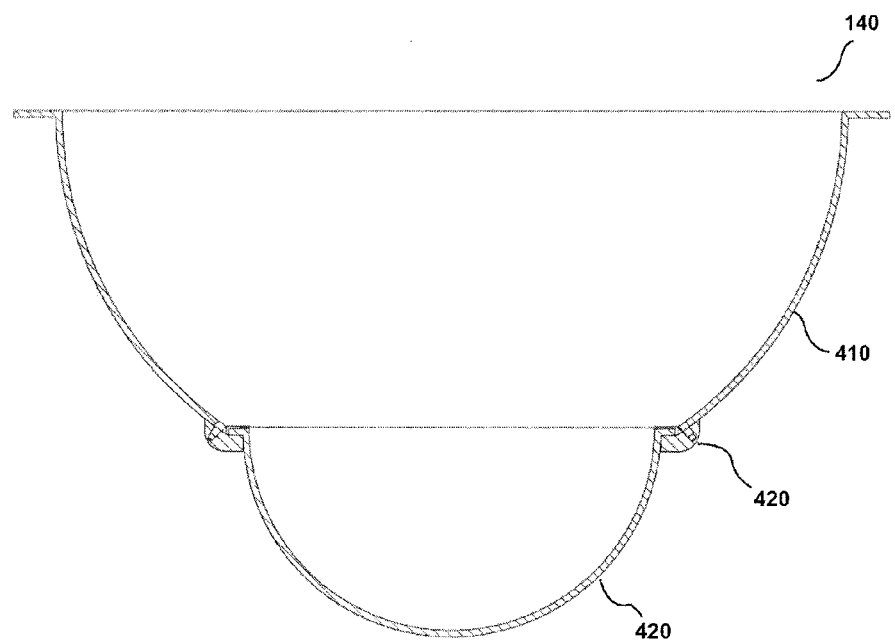
FIG. 4A is a cross-sectional view of an embodiment of a compound viewing dome for use in a camera assembly according to the teachings of the invention.

The transparent compound cover 140 illustrated in FIG. 4A encloses the lower half of the camera assembly 100 in this embodiment and comprises two sections 410 and 430. In this embodiment, the upper section 410 of the transparent cover is aligned with the optical axis of at least one of the fixed cameras, for example 150, (and it is preferably aligned with optical axes of both cameras 150 and 160) presenting a low distortion view port as illustrated in FIG. 3. The lower section 430 of the transparent cover 140 is aligned with the optical axis 120a of the PTZ camera 120 presenting an optically coherent hemispherical view port. In other words, an extension of the optical axes of the cameras 150 and 160 passes through the center C2 of the truncated hemisphere forming the upper section, and an extension of the optical axis of the PTZ camera 120 passes through the center C1 of the lower hemisphere (see FIG. 1).

In this embodiment, the upper section 410 has a larger diameter than the lower section 430, which is coupled to the upper section 410. Other embodiments may for example couple two, three or more domes to the upper section.

In this embodiment, the lower section 430 and upper section 410 may be joined using a variety of techniques. For example, in this embodiment, the upper and the lower sections are joined mechanically using an adaptor ring 420 and screws 450 (see FIG. 4B) and weather sealed by employing thermal fusing, adhesive bonds or gaskets, or any combination, with examples in this embodiment not intended to be limiting and describing only a single PTZ.

The sectional view cover 140 provides a number of advantages. For example, individual sections can be constructed of different materials having unique optical reflection or absorption characteristics. By way of example, the upper section 410 can be semi-transparent to visible radiation, for example tinted, and the lower section 430 (i.e., the PTZ view cover) can be transparent to visible radiation or vice versa or any combination. This is advantageous in selectively disguising the count and/or orientation of cameras inside the assembly 100 or enhancing optical contrast for certain wavelengths of lights or illumination conditions. Further, in some embodiments constructing the compound dome cover 140 from two separate pieces obviates the need for costly injection molds and the difficulties (e.g., optical distortion) that can happen when heat extruding a sheet of transparent material to construct a single piece cover.

Figure 4B:
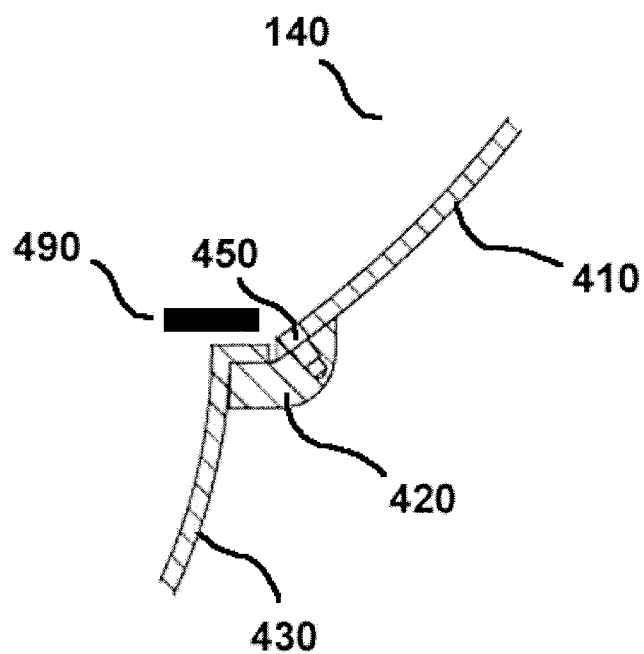
FIG. 4B is a cross-sectional view of a coupling junction between two sections of a viewing dome according to an embodiment of the invention.

In some embodiments, the intersection region of the upper and lower sections also provides an advantageous location for installing a heating coil 490 with the cross section and example of placement location shown in FIG. 4B. The heating coil in the system 100 can function to defrost and prevent condensation on the transparent view port 140 in low temperature conditions.

Those having ordinary skill in the art will appreciate that various changes can be made to the above embodiments without departing from the scope of the invention.

The invention claimed is:

1. A camera assembly, comprising:
   a panable, tiltable zoom (PTZ) camera,
   a plurality of fixed cameras capable of detecting visible radiation and generating images based on said detected visible radiation, said fixed cameras positioned around the PTZ camera, and
   a common compound viewing cover comprising a first section enclosing said PTZ camera and a second section enclosing said plurality of fixed cameras such that said PTZ camera and said fixed cameras are capable of receiving visible radiation from respectively the first and second sections of said viewing cover, detecting said received visible radiation, and generating images based on said detected visible radiation,
   wherein said second section is in the form of a truncated hemisphere and the fixed cameras are positioned such that an extension of an optical axis of each of said fixed cameras passes through the center of said truncated hemisphere,
   wherein the first section and the second section are interlocked with one another, wherein the first section comprises a hemispherical dome and the truncated hemisphere forming the second section has a larger diameter than that of the hemispherical dome.

2. The camera assembly according to claim 1, wherein the compound viewing cover is arranged to enclose a plurality of components of the camera assembly.

3. The camera assembly according to claim 1, wherein said first section is concentric with an optical axis of the panable tiltable zoom camera.

4. The camera assembly according to claim 1, wherein the plurality of fixed cameras and said second section of the compound cover are adapted to provide wide field of view imagery.

5. The camera assembly according to claim 1, wherein the PTZ camera and said first section of the compound viewing cover are adapted to provide close-up imagery selected from the wide field of view imagery obtained by the fixed cameras.

6. The camera assembly according to claim 1, wherein the compound viewing cover is formed of any of optically clear, or tinted material.

7. The camera assembly according to claim 1, wherein said compound viewing cover comprise a reflective coating.

8. The camera assembly according to claim 1, wherein said second section of the viewing cover comprises an opening having a perimeter at an intersection of said second section with a circumference of said first section.

9. The camera assembly according to claim 1, wherein said first and second sections of the viewing cover are thermally fused to one another.

10. The camera assembly according to claim 1, wherein said first and second sections of the viewing cover are joined to one another via an adhesive seal.

11. The camera assembly according to claim 1, wherein said first and second sections of the viewing cover are joined to one another via any of a ring, one or more gaskets and one or more screws.

12. The camera assembly according to claim 1, wherein the first section of the viewing cover is coupled to the second section of the viewing cover.

13. The camera assembly according to claim 1, wherein the pan tilt camera is configured to be directable in response to detection of one or more moving object(s) by the fixed cameras in a field of view or at the direction from a user to acquire one or more close-up zoom images of the moving object(s).

14. The camera assembly according to claim 13, wherein the images acquired by the pan tilt camera represent a region of interest in the wide field of view captured by the fixed camera.

15. The camera assembly according to claim 1, wherein at least one of said fixed cameras has an adjustable tilt.

* * * * *